United States Patent [19]

Klocke

[11] Patent Number: 5,240,892

[45] Date of Patent: Aug. 31, 1993

[54] SMALL CRYSTAL ZSM-5, AS A CATALYST

[75] Inventor: Donald J. Klocke, Somerdale, N.J.

[73] Assignee: Mobil Oil Corporation, Fairfax, Va.

[21] Appl. No.: 823,408

[22] Filed: Jan. 21, 1992

Related U.S. Application Data

[63] Continuation-in-part of Ser. No. 649,286, Jan. 30, 1991, abandoned, which is a continuation of Ser. No. 393,029, Aug. 10, 1989, abandoned, which is a continuation of Ser. No. 92,505, Sep. 2, 1987, abandoned.

[51] Int. Cl.$^5$ ............................................. B01J 21/00
[52] U.S. Cl. ...................................... 502/77; 502/60; 423/700; 423/DIG. 22
[58] Field of Search ............... 502/60, 77; 423/700, 423/DIG. 22

[56] References Cited

U.S. PATENT DOCUMENTS

| | | | |
|---|---|---|---|
| 4,175,114 | 11/1979 | Plank et al. | 423/329 |
| 4,562,055 | 12/1985 | Arika et al. | 423/329 |
| 4,572,779 | 2/1986 | Iwayama et al. | 208/111 |
| 4,578,371 | 3/1986 | Rieck et al. | 502/71 |
| 4,605,637 | 8/1986 | Chang et al. | 502/64 |
| 4,650,655 | 3/1987 | Chu et al. | 423/328 |
| 4,661,467 | 4/1987 | Kuehl | 502/202 |
| 4,891,199 | 1/1990 | Latovrrette et al. | 423/700 |
| 5,102,644 | 4/1992 | Plank et al. | 423/700 |

FOREIGN PATENT DOCUMENTS

| | | |
|---|---|---|
| 0110650 | 6/1984 | European Pat. Off. |
| 0234684 | 9/1987 | European Pat. Off. |
| 59-64520 | 4/1984 | Japan |

OTHER PUBLICATIONS

New Developments in Zeolite Science and Technology, 1986, pp. 223-230.

*Primary Examiner*—R. Bruce Breneman
*Attorney, Agent, or Firm*—Alexander J. McKillop; Malcolm D. Keen; Marina V. Schneller

[57] ABSTRACT

A process for preparing, in the absence of organic directing agent, a porous crystalline silicate having the structure of ZSM-5 having a sorption capacity for mesitylene of at least about 3 weight percent which comprises:

a) providing a crystallization reaction mixture which includes a source of at least one component of crystalline silicate framework element, including silicon, wherein the solids content of said source in the crystallization reaction mixture is at least 35 weight percent;

b) maintaining the crystallization temperature at less than about 250° C.

c) maintaining agitation conditions during crystallization sufficient to result in said crystal size;

d) maintaining a mole ratio of $OH^-/SiO_2$ in the reaction mixture of at least about 0.11; and e) recovering porous crystalline silicate crystals.

20 Claims, 1 Drawing Sheet

SMALL CRYSTAL ZSM-5, AS A CATALYST

CROSS REFERENCE TO RELATED APPLICATIONS

This is a continuation-in-part of Ser. No. 649,286, filed Jan. 30, 1991, now abandoned, which in turn is a continuation of Ser. No. 393,029 filed Aug. 10, 1989 (now abandoned), which in turn is a continuation of Ser. No. 092,505 filed Sep. 2, 1987 (now abandoned), each of which is relied upon and is, in its entirety, incorporated by reference herein.

FIELD OF THE INVENTION

The present invention relates to the preparation of a porous crystalline silicate having the structure of ZSM-5 and a crystal size, one dimension of which can be less than about 0.02 micron and having a mesitylene sorption capacity of at least about 3.0 weight percent.

The invention relates to a catalyst composition which in the production of $C_8+$ aromatics, including m-xylene and p-xylene, exhibits reduced selectivity for o-xylene. Specifically, the catalyst comprises ZSM-5 formed from reaction mixture, in which the $OH^-/SiO_2$ molar ratio is greater than 0.11. Moreover, the reaction mixture is characterized by a high aluminum to silicon ratio and/or is characterized by high solids loadings. The altered selectivity of the catalyst has application in, for example, alkylation (e.g. ethylation) of benzene and/or methylbenzene which are subsequently dehydrogenated to produce styrene and/or methylstyrene products; such alkylation feeds are preferably substantially free of o-xylene for downstream conversions in, for example, dehydrogenations and polymerizations.

BACKGROUND OF THE INVENTION

ZSM-5 is a versatile catalyst. Crystalline ZSM-5 and its preparation are described in U.S. Pat. No. 3,702,886, the entire disclosure of which is incorporated herein by reference. It has a distinctive X-ray diffraction pattern which identifies it from other known crystalline silicates. A crystalline silicate composition having the structure of ZSM-5 is described in U.S. Pat. Re. 29,948, the entire disclosure of which is incorporated herein by reference. U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a constraint index of 1 to 12 and an alumina/silica mole ratio of not greater than 0.083 from a specified reaction mixture containing an organic nitrogen-containing cation provided by a compound such as tetrapropylammonium bromide, triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. patent application Ser. No. 014,147, filed Feb. 12, 1987, the contents of which are incorporated herein by reference discloses a method for preparing porous crystalline silicates such as ZSM-5 from a reaction mixture free of organic directing agent, including the preparation of ZSM-5 having a crystal size of $0.15 \times 0.15 \times 0.01$ (micron) and a mesitylene adsorption weight gain of 2.91 weight percent.

It has now been found that ZSM-5 capable of enhanced mesitylene sorption can be prepared under conditions similar to those described in U.S. patent application Ser. No. 014,147 where the $OH^-/SiO_2$ molar ratio and solids content of the reaction mixture are carefully controlled. The present invention is also of interest in that the resulting crystals can have at least one dimension less than about 0.02 micron or preferably at least 0.01 micron. Moreover, these crystals have an equilibrium sorption capacity for mesitylene of at least about 3.0 weight percent at room temperature.

One method for measuring the diffusion characteristics, such as crystal surface area, of a porous crystalline silicate is by determination of its capability for sorbing mesitylene. Such sorption is carried out under static conditions at room temperature under pressure for such time as necessary to effect equilibrium, e.g., a temperature of 72° F. a pressure of 0.5 mm Hg, for about 6 hours. The procedure is further described by Wu et al, "New Developments in Zeolite Science Technology", Proceeding of the 7th International Zeolite Conference, Tokyo, Japan, pp. 547–554 and G. R. Landolt, *Anal. Chem.* (1971) 43, 613, both of which are incorporated herein by reference. The porous crystalline silicates of the present invention can be distinguished over small crystal silicates of the prior art by their high capacity for mesitylene sorption under these conditions, generally greater than about 3 weight percent, preferably greater than about 5 or even greater than about 10 weight percent, say about 6 to 12 weight percent.

This invention relates to a process for the alkylation of an aromatic hydrocarbon by reaction with an olefin in the presence of a porous crystalline silicate ZSM-5 catalyst which has an alpha value below about 100 and a diffusion rate constant $(D/r^2 \times 10^{-6})$ of at least about $100 \text{ sec}^{-1} \times 10^{-6}$.

Alkylation of aromatic hydrocarbons utilizing porous crystalline silicate catalysts has heretofore been described. U.S. Pat. No. 3,751,504 to Keown et al., and U.S. Pat. No. 3,751,506 to Burress describe vapor phase alkylation of aromatic hydrocarbons with olefins, e.g., benzene with ethylene in the presence of a ZSM-5 zeolite catalyst. U.S. Pat. No. 4,016,218 to Wise describes vapor phase alkylation with a shape-selective zeolite such as ZSM-5 which has been modified by steaming to an alpha value less than 250. All of the above patents are incorporated herein by reference.

The latter type catalysts represent a distinct improvement over previously suggested crystalline aluminosilicate catalysts particularly with respect to improved aging properties. However, they can produce unwanted quantities of impurities along with the desired alkyl aromatic product, thereby decreasing the overall yield and selectivity for such product.

Thus, in the alkylation of benzene with ethylene, while desired ethylbenzene is the major product, small amounts of di and possibly triethylbenzenes are always produced simultaneously with ethylbenzene, such amounts depending on the conversion of benzene to ethylbenzene. The polyethylbenzenes formed can be recycled to the alkylation zone, where they undergo transalkylation with benzene to produce more ethylbenzene. Alternatively, the polyethylbenzenes can be transalkylated with benzene in a separate reactor. The formation of polyethylbenzenes hence does not constitute an ultimate loss of the alkylating agent, ethylene. On the other hand, aromatic compounds other than ethylbenzene and polyethylbenzenes, that are formed during the alkylation reaction, generally referred to as by-products, result in an irreversible loss of ethylene and cause difficulties in the product purification. By-products produced during ethylation of benzene include, for example, toluene, xylenes, cumene, n-propylbenzene, ethyltoluene, butylbenzene and other $C_{10}+$ aromatics, the majority being $C_7$-$C_9$ aromatics. Production of o-xylene is especially undesirable in view of its relatively low commercial value. The formation of these by-products is increased when the benzene conversion to ethylbenzene is high. Due to the high exothermicity of the alkylation reaction, ethylbenzene synthesis is generally carried out in a multiplicity of reactors with interstage cooling and addition of ethylene to the various stages, the ethylbenzene concentration increasing in subsequent stages. Undesired by-products are accordingly formed in increasing amounts in the latter stages of the process.

Moreover, in the alkylation of toluene with ethylene, xylenes, and other $C_{10}+$ aromatics, the majority being $C_7$-$C_9$ aromatics, are produced. Alkylation of toluene and then dehydrogenation of ethyl toluene produces the valuable vinyltoluene crosslinking agent. Since the efficacy of vinyltoluene as a crosslinking agent is decreased by contamination with the by-product o-xylene, coproduction of o-xylene in the alkylation is especially undesirable since it is of relatively low commercial value and it decreases the value of the desired product.

In accordance with the present invention, there has been discovered a process for decreasing the selectivity for o-xylene while using a catalyst which affords a high yield of the alkylate of interest over a long and commercially attractive period of time.

The process comprises effecting alkylation of aromatic hydrocarbons by contacting the same with an olefin under conditions effective for accomplishing said alkylation, e.g., a reactor inlet temperature between about 575° F. and 900° F., preferably with a reactor bed temperature as much as 250° F. above the reactor inlet temperature, a pressure between atmospheric and about 3000 psig, employing a mole ratio of hydrocarbon charge aromatic to olefin alkylating agent in the approximate range of 1:1 to 30:1 and a total feed weight hourly space velocity between about 2 and about 2000, in the presence of a catalyst having an alpha value below about 100 preferably below about 75, say from about 30 to 65, comprising a porous crystalline silicate having the structure of ZSM-5 and having a diffusion rate constant (o-xylene) ($D/r^2$) of at least about 100 $sec^{-1} \times 10^{-6}$, preferably at least about 150, say greater than from about 175 $sec^{-1} \times 10^{-6}$ where D=the diffusion coefficient ($cm^2/sec$) and r= the crystal radius (cm). Diffusivities are determined by measuring the time ($t_{0.3}$) it takes to sorb 30% of o-xylene (of total o-xylene capacity) by the rate constant determination test described in U.S. Pat. No. 4,117,026, incorporated herein by reference as to that description. The characteristic diffusion time, $t_{0.3}$, is a direct measure of the critical mass transfer property $r^2/D$.

SUMMARY OF THE INVENTION

The porous crystalline silicates used in the present invention can be prepared from a non-gelling, non-organic forming mixture having a solids content of at least about 30, preferably at least about 35 weight percent comprising a silica source of precipitated silica having a particle size of 1 to 500 microns, a source of alkali metal and a source of water.

The present invention further relates to a process for preparing, in the absence of organic directing agent, a porous crystalline silicate having the structure of ZSM-5. The product silicate can have a crystal size wherein at least one dimension is less than about 0.02 micron, preferably less than about 0.01, in some cases even less than about 0.005 micron, and a sorption capacity for mesitylene of at least about 3.0 weight percent. The process for preparing said silicate comprises:

a) providing a crystallization reaction mixture which includes a source of at least one component of crystalline silicate framework element, including silicon, wherein the solids content of the source in the crystallization reaction mixture is at least 35 weight percent;

b) maintaining the crystallization temperature at less than about 250° C.;

c) maintaining sufficient agitation during crystallization to result in said crystal size;

d) maintaining a mole ratio of $OH^-/SiO_2$ in the reaction mixture of at least about 0.11; and, after a time sufficient for crystallization to occur, e) recovering porous crystalline silicate crystals capable of sorbing at least about 3.0 weight percent mesitylene.

DESCRIPTION OF THE DRAWING(S)

The FIGURE depicts a flow sheet which shows an embodiment for producing ZSM-5 in accordance with the invention.

DETAILED DESCRIPTION OF THE INVENTION

Figure 1:
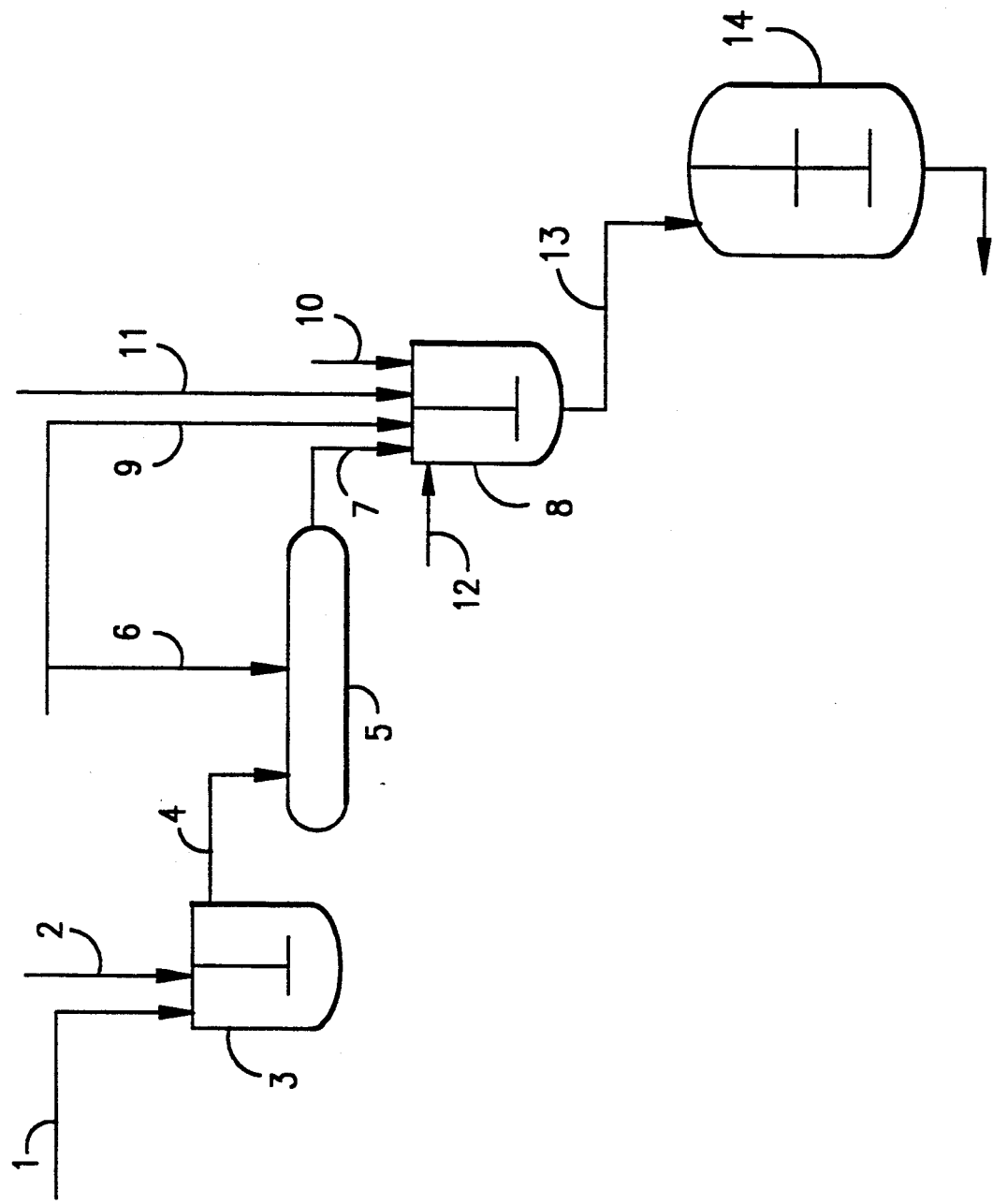

In one embodiment of the invention, a component of the crystallization reaction mixture is a silica precipitate, the particle size of which is in the range of 1 to 500 microns.

Preferably, a silica precursor is formed under conditions which insure certain minimal particle size of the precipitated silica precursor and subsequent reaction of that silica precursor, in crystallization reaction mixtures of controlled composition, to form the porous crystalline silicate. Such a procedure has the advantage of increased throughput and yield.

The silica precursor is formed from a solution of a silica source. Conveniently, the solution is an aqueous solution of a pH ranging from 9 to 12. The source of silica can be any soluble silicate and is preferably sodium silicate.

The silica precursor can be formed by its continuous precipitation from the solution phase. Accordingly, precipitation can comprise initiating precipitation and maintaining said precipitation. More particularly, the precipitation step can be continuous.

Alteration of the composition of the solution of silica source can be undertaken by introducing a precipitating reagent. In one embodiment, the precipitating reagent can be an acid solution. The acid of the solution may be any mineral acid, such as $H_2SO_4$, HCl, $HNO_3$, etc. The acid solution can have a pH ranging from essentially 0 to about 6. Thus in one embodiment of the invention, precipitation can be effected by acid neutralization of a basic solution of a silicate.

In one of two alternative embodiments, the silica can be precipitated alone, i.e., in the absence of sources of other crystalline silicate framework elements. In this embodiment, both the precipitating reagent and the solution of silica source can be free of intentionally added alumina or alumina source.

However, silicate precipitation can also occur as coprecipitation in the presence of soluble sources of other porous crystalline silicate framework elements, e.g., gallium, indium, boron, iron and chromium. The soluble source of these other framework components can be e.g., nitrates. The coprecipitation product would be an amorphous, e.g., gallosilicate, borosilicate, ferrosilicate. Alternatively, soluble sources of gallium, indium, boron, iron and/or chromium can be added with the precipitated silica precursor to the zeolite crystallization stage.

Continuous precipitation of the amorphous silicate precursor comprises introducing the solution of silica source and the precipitating reagent to a reaction zone while maintaining a molar ratio of silica source to precipitating reagent substantially constant. In one embodiment, the precipitating reagent and the silica source are introduced simultaneously into the reaction zone.

The continuous precipitation of silica precursor effects two results. Firstly, silica gel formation is at least substantially eliminated and secondly, precipitated silica precursor particle size exceeds that silica particle size at which silica gel formation is possible. The precipitated silica precursor comprises agglomerated solids in the shape of microspheres. Suspensions of these particles exhibit low viscosities at high solids loadings in subsequent processing, including zeolite synthesis, for example, even at solids loadings of 35 weight percent solids. This is in marked contrast to non-controlled neutralization which results in a solid, non-stirrable mass. The particle size of the silica precipitate can range between 1-500 microns with an average size of 50-100 micron.

Other conditions affecting precipitation include time, pH and temperature. The temperature of the precipitation mixture can range from 80°-300° F. (about 27° C. to 150° C). The time of contact of the solution of silica source and the precipitating reagent can range from about 10 minutes to several hours at pH maintained from about 6 to 11. Generally, the silica precursor is processed by isolating it, e.g., by filtration, and removing soluble contaminants therefrom, by washing and/or ion exchange. This stage can be considered a solids consolidation step.

The silicon source, e.g., silica precursor, can be crystallized to a crystalline silicate (or crystalline aluminosilicate), having an X-ray diffraction pattern corresponding to ZSM-5. If the crystallographically crystalline material to be produced is to include an element selected from the group consisting of alumina, gallium, indium, boron, iron, chromium, or mixtures thereof, a soluble source of said element(s) can be employed after the silica precursor precipitation. In one embodiment of the invention, the source of alumina is added to the crystallization formulation containing the silica precursor for crystallization to produce ZSM-5. The source of alumina can be any aluminum salt, for example, aluminum sulfate. The amount of the source of alumina etc., will depend on the desired ultimate aluminum content of the zeolite and on the zeolite production method. Generally, the $SiO_2/Al_2O_3$ molar ratio can be greater than about 20, but for purposes of the present invention less than about 50, or less than about 40, say, e.g., 25 to 40, is preferred. The silicon source and aluminum source can be admixed together in any order without adverse affects.

The crystallographically crystalline silicate is prepared from a crystallization reaction mixture containing the silicon source and water. In accordance with the invention herein, no organic, sometimes referred as a "template" or "directing agent" need be present in the zeolite crystallization reaction mixture. In addition to amines, such organic compounds which may be components of the crystallization reaction mixtures contain any element of Group VB such as nitrogen or phosphorus, preferably nitrogen. The absence of that organic, in accordance with the invention, dictates an $SiO_2:Al_2O_3$ of less than about 100, for ZSM-5 production, preferably less than about 50, more preferably less than about 40, say from about 25 to about 40. By comparison, when ZSM-5 production is undertaken in the presence of an organic directing agent, the $SiO_2:Al_2O_3$ ratio can be greater than about 20.

An advantage of the process of the invention is that it prepares small crystal size ZSM-5 of high mesitylene sorption capacity by a process in which no organic is added. Other advantages resulting include reduction in cost, reduction in environmental concerns due to the volatility of certain organics used in the crystallization-synthesis of zeolites, and reduction in porous crystalline silicate processing steps to remove the organic. Preferably the crystallization reaction mixture will contain seeds of suitable porous crystalline silicate crystals which serve to increase the rate of crystallication, preferably seeds having at least one dimension are used, for example, less than about 0.05 micron small size seeds, (having at least one dimension of 0.02-0.05 micron) and having the structure of ZSM-5. The percentage of seeds in the crystallization reaction mixture should be at least about 1% based on total solids in the reaction mixture, preferably at least about 4%, say about 5-10% if non alkali-treated seeds are used. Furthermore, they could be mixed with silica and/or alumina sources to be mulled or attrited (to provide larger surface area and intimate contact among the ingredients) before reaction. The source of seeds may be slurry from a (based on total solids) previous crystallization, processed or unprocessed, recycled to the crystallizer vessel.

The temperature employed during crystallization ranges from about 100° to about 250° F., preferably from about 190° to 230° F., say about 220° F. Pressure during crystallization ranges from about 10 to 50 psig, preferably autogenous pressure. The duration of the crystallization procedure ranges from about 60 to about 120 hours, preferably from about 80 to about 100 hours.

Agitation conditions maintained during crystallization should be sufficient to produce porous crystalline silicates of the desired crystal size. Such conditions can be arrived at empirically, but in a 2 to 30 gallon reactor having a length/diameter ratio ranging from 1 to 2, sufficient agitation can be achieved by stirring at at least about 200 rpm, preferably at least about 250 rpm.

The solids content of the crystallization mixture, including seeds, at the beginning of crystallization is critical to the process of the present invention. Such content is relatively very high, generally greater than about 35 weight percent, preferably greater than about 37 weight percent.

It has also been found that the $OH^-/SiO_2$ molar ratio maintained during crystallization is important to the process of the present invention. Such ratios are generally greater than about 0.11, preferably greater than about 0.12, say from about 0.12 to 0.20.

Ion exchange of the crystalline silicate materials can be conducted to effect ammonium exchange at acidic sites of said materials. The source of the ammonium ion is not critical; thus the source can be ammonium hydroxide or an ammonium salt such as ammonium nitrate, ammonium sulfate, ammonium chloride and mixtures. These reagents are usually in aqueous solutions; by way of illustration, aqueous solutions of 1N $NH_4H$, 1N $NH_4NO_3$, 1N $NH_4Cl$ and 1N $NH_4Cl/NH_4OH$ have been used to effect ammonium ion exchange on these, and similar materials. The pH of the ion exchange is not critical but generally maintained at 7 to 12. Ammonium exchange may be conducted for a period of time ranging from about 0.5 to about 20 hours at a temperature ranging from ambient up to about 100° C. The ion exchange may be conducted in multiple stages. Calcination of the ammonium exchanged material will produce the crystalline silicate or zeolite in its acid form. Calcination can be effected at temperatures up to about 600° C.

In the case of many catalysts, it is desired to incorporate the porous crystalline silicate hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the zeolite ZSM-5, i.e. combined therewith, which is active, may enhance the conversion and/or selectivity of the catalyst in certain organic conversion processes. Inactive materials suitably serve as diluents to control the amount of conversion in a given process so that products can be obtained economically without employing other means for controlling the rate or reaction. Frequently, crystalline silicate materials have been incorporated into naturally occurring clays, e.g., bentonite and kaolin. These materials, i.e. clays, oxides, etc., function, in part, as binders for the catalyst. It is desirable to provide a catalyst having good physical strength, because in petroleum refinery processing, the catalyst is often subjected to conditions which tend to break the catalyst down into powder-like materials which cause problems in processing.

Naturally occurring clays which can be composited with the hereby synthesized zeolite ZSM-5 include the montmorillonite and kaolin families which include the sub bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite ZSM-5 catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline silicate and inorganic oxide gel matrix vary widely with the crystalline silicate content ranging from about 0.1 to about 90 percent by weight, and more usually in the range of about 10 to about 70 percent by weight of the composite.

In general, organic compounds such as, for example, those selected from the group consisting of hydrocarbons, alcohols and ethers, can be converted to conversion products such as, for example, aromatics and lower molecular weight hydrocarbons, over the catalytically active form of the composition of this invention by contact under organic compound conversion conditions including a temperature of from about 100° C. to about 800° C., a pressure of from about 0.1 atmosphere (bar) to about 200 atmospheres, a weight hourly space velocity of from about 0.08 $hr^{-1}$ to about 2000 $hr^{-1}$ and a hydrogen/feedstock organic compound mole ratio of from 0 (no added hydrogen) to about 100.

The present invention will now be described with reference the FIGURE. A dilute solution of sulfuric acid or a mixture of dilute sulfuric acid and dilute aluminum sulfate, i.e. acid alum solution, is passed via line 1, and a dilute aqueous solution of sodium silicate is passed via line 2 to continuous reactor 3 under sufficient conditions to produce a precipitate-containing reaction product thereof. The contents of reactor 3 are preferably stirred sufficiently to form a visible vortex. Flow rates are controlled to yield an apparent residence time in reactor 3 of about 30 minutes, for example, although residence times greater than about 3 minutes are suitable. Solution strengths are such that the solids content of the resulting slurry ranges from about 5 wt. % to about 20 wt. %, preferably about 10 to 15 wt. %.

The reaction product from reactor 3 is passed via line 4 to a first filtering means 5, e.g. a belt filter, whereupon it is washed with water from line 6. The washed material from first filtering means 5 is passed via line 7 to charge tank 8, along with water from line 9, sodium hydroxide solution, if desired, from line 10, and, if desired, an aqueous slurry containing seed crystals of ZSM-5, from line 11. If aluminum sulfate was not included in the line 1 feed to continuous reactor 3, e.g. as an acid alum solution, then it may be added, if desired, to the charge tank 8 at this time via line as an aqueous solution of, for example, about 47 wt. %. The contents of charge tank 8 are preferably stirred sufficiently to maintain suspension of solids.

The resulting mixture from charge tank 8 is charged batch-wise or continuously via line 13 to crystallizer 14. Crystallizer 14 is brought to and maintained at conditions sufficient for crystals of ZSM-5 to form, including a temperature of from about 90° C. to about 250° C., a residence time of from about 3 hours to about 100 hours and with stirring to provide adequate heat transfer and suspension of solids.

The reaction mixture in crystallizer 14 will have a composition in mole ratios within the ranges of:
$SiO_2/Al_2O_3$ = 25 to 50, preferably 30 to 40
$H_2O/SiO_2$ less than 5, preferably less than 4.9
$OH^-/SiO_2$ greater than 0.11, preferably greater than 0.12.

The original cation can be replaced, at least in part, by ion exchange with another cation. Thus, the original cations are exchanged into a hydrogen form or a form in which the original cation has been replaced by a metal of Groups IIA, IIIA, IVA, IB, IIB, IIIB, IVB, VIB or VIII or the Periodic Table. Catalytically active forms of these would include, in particular, hydrogen, rare earth metals, aluminum, metals of Groups II and VIII or the Periodic Table and manganese.

ZSM-5 prepared in accordance herewith can be used in the alkali metal form, hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-5 such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

ZSM-5, when employed either as an adsorbent or as a catalyst in a hydrocarbon conversion process, should be dehydrated at least partially. This can be done by heating to a temperature in the range of from about 200° C. to about 600° C. in an inert atmosphere, such as air, nitrogen, etc. and at atmospheric or subatmospheric pressures for between about 1 and 48 hours. Dehydration can also be performed at lower temperature merely by placing the porous crystalline silicate in a vacuum, but a longer time is required to obtain a particular degree of dehydration. The thermal decomposition product of the newly synthesized ZSM-5 can be prepared by heating same at a temperature up to about 550° C. for from about 1 hour to about 48 hours.

As above mentioned, ZSM-5 prepared in accordance herewith can have the original cations associated therewith replaced by a wide variety of other cations according to techniques well known in the art. Typical further replacing cations include metal cations and mixtures thereof. Of the replacing metallic cations, particular preference is given to cations of metals such as rare earths, Ga, Mn, Ca, Mg, Zn, Cd, Pd, Ni, Cu, Ti, Al, Sn, Fe and Co.

Typical ion exchange technique would be to contact the synthetic zeolite with an aqueous solution of a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the metal salt solution of the desired replacing cation, the zeolite is then preferably washed with water and dried at a temperature ranging from 65° C. to about 315° C. and thereafter may be calcined in air or an inert gas at temperatures ranging from about 200° C. to about 550° C. for periods of time ranging from about 1 to about 48 hours or more to produce a catalytically-active thermal decomposition product thereof.

The porous crystalline silicate having the structure of ZSM-5 prepared by the method of the present invention is of particular interest insofar as it is in the form of a crystal having two dimensions of at least about 0.05 micron, preferably at least about 0.1 micron, and a third dimension of less than about 0.02 micron, preferably less than about 0.01 micron, say less than about 0.05 micron, wherein said crystal comprises a tortuous or sinusoidal channel running substantially in the direction of said third dimension. Such a crystal can be in the form of platelets wherein the two larger dimensions are substantially the same. The orientation of the tortuous channel can be confirmed by electron diffraction techniques.

The following Examples are given by way of illustration and are not to be construed as limiting the invention in any way.

EXAMPLES

Example 1

Preparation of Silica Precipitate Precursor

The silica precipitate precursor for porous crystalline silicate was produced using the formulations given in Table 1. Processing was in accordance with the flow diagram shown in the FIGURE.

The properties of the silica precursor are given in Table 2. The precursor is made in a continuous manner by neutralizing a sodium silicate solution under carefully controlled conditions. The resulting product is a suspension of agglomerated solids in the shape of microspheres. Because of the size and shape, and because primary agglomeration has already taken place, suspensions of these particles exhibit low viscosities at high solids loadings (at least 35 weight percent). This is in marked contrast to an equivalent, non-controlled neutralization which results in solid, non-stirrable mass. The particle size of the precursor ranges between 1–500 microns but the average size is 70 microns.

TABLE 1

| PRECURSOR SYNTHESIS* | |
|---|---|
| Volume Basis | |
| Silicate Solution | |
| Sodium Silicate | 100 |
| (Q-Brand 29% SiO$_2$, 9% Na$_2$O) | |
| 50% NaOH | 1.03 |
| H$_2$O (Demineralized) | 98.9 |
| Acid Solution | |
| 24% H$_2$SO$_4$ | 67.0 |

*The two solutions are reacted continuously at 30 minutes residence time in a plastic vessel equipped with an overflow and mixer. The vessel is filled with water. The silicate solution and the acid solution are pumped into the vessel in a continuous manner.

The pH is controlled to about 8. The average residence time of the product is 30 minutes, and it is discharged continuously from the vessel by an overflow tube.

The product is collected, filtered and washed with demineralized water to be sulfate free.

TABLE 2

| ANALYSIS OF WASHED PRECURSOR | |
|---|---|
| | Wt. Percent |
| Sulfur | 0.005 |
| Silica | 91.3 |
| Alumina | 0.1 |
| Sodium | 1.5 |
| Ash at 1000° F. (542° C.) | 95.53 |

Example 2

Preparation of ZSM-5 Using Varying Solids Contents

Using the silica precursor produced in Example 1, ZSM-5 was produced in the absence of organic directing agent using the formulations of Runs A, B and C in Table 3. The analysis of the resulting product is also given in Table 3. This example shows the necessity of the solids loading (37%) and the $OH^-/SiO_2$ ratio (0.11) in the synthesis of nonorganic ZSM-5 with crystal sizes 0.01 micron. The syntheses were carried out at 220° F. and 250 RPM in a 5 gallon autoclave. A seed level of 5% ZSM-5 seeds with crystal sizes below 0.05 micron was used in order to complete each synthesis within a practical time frame.

Table 3 shows the effect of solids level at a constant $OH^-/SiO_2$ ratio on the crystal size of ZSM-5. From this table it is seen that as the solids level is increased from 33% to 37% a reduction of crystal size occurs from 0.7 to 0.2 micron. These results are further confirmed by mesitylene sorption data which increases correspondingly. Mesitylene sorption has been shown to correlate well with changes in crystal surface area (hence crystal size) of ZSM-5.

TABLE 3
EFFECT OF SOLIDS LEVEL ON CRYSTAL SIZE

| | A | B | C |
|---|---|---|---|
| $SiO_2/Al_2O_3$, molar | 32 | 32 | 31.4 |
| $OH^-/SiO_2$, molar | 0.092 | 0.104 | 0.109 |
| $H_2/SiO_2$, molar | 6.14 | 5.44 | 4.89 |
| $OH^-/H_2O$, molar | 0.015 | 0.019 | 0.022 |
| Solids, wt. % | 33 | 35.2 | 37.2 |
| Seeds, wt. % | 5.0 | 4.73 | 4.92 |
| Synthesis Conditions | | | |
| Temp., °F. | 220 | | |
| Agitator Speed, RPM | 250 | 250 | 250 |
| Product Analysis | | | |
| XRD | 75% | 70% | 60% |
| SEM. | 0.7 | 0.4 | — |
| TEM, Basal Dimension. | — | — | 0.1–0.4 |
| Thickness, A | — | — | 100 |
| Mesitylene Sorption, wt % | 0.5 | 1.3 | 3.7 |

Example 3

Preparation of ZSM-5 Using High Solids Content and Varying $OH^-/SiO_2$ Molar Ratios in Reaction Mixture Using the silica precursor produced in Example 1, ZSM-5 was produced in the absence of organic directing agent using the formulation of Runs D, E, F, and G in Table 4 below. The analysis of the resulting product is also given in Table 4.

This example shows the need for high solids loading and high $OH^-/SiO_2$ molar ratio in the synthesis of non-organic ZSM-5 of small crystal size and high mesitylene sorption capacity.

The effect of $OH^-/SiO_2$ ratio, at a constant solids level is shown in Table 4. From this table it is seen that at a solids level of 37%, there is progressive reduction in crystal size of the ZSM-5 with increasing $OH^-/SiO_2$ ratio. A crystal size of 0.3 micron on edge was observed at a $OH^-/SiO_2$ ratio of 0.086. An increase in the above ratio to 0.124 resulted in platelets with basal dimensions of 0.1–0.4 microns. The thickness of these platelets was about 0.01 micron (100A). A monotonic increase in mesitylene sorption was observed upon increasing the $OH^-/SiO_2$ molar ratio from 0.086 to 0.163.

TABLE 4
EFFECT OF CAUSTIC CONCENTRATION ON CRYSTAL SIZE

| RUN | D | E | F | G |
|---|---|---|---|---|
| $SiO_2/Al_2O_3$ | 31.9 | 31.4 | 31.9 | 32.8 |
| $OH^-/SiO_2$ | 0.086 | 0.109 | 0.124 | 0.164 |
| $H_2O/SiO_2$ | 4.89 | 4.96 | 4.87 | 4.83 |
| $OH^-/H_2O$ | 0.0177 | 0.0219 | 0.0254 | 0.0339 |
| % Solids | 37.45 | 37.18 | 37.2 | 37.1 |
| % Seeds | 5.02 | 4.9 | 5.02 | 4.9 |
| Synthesis Conditions | | | | |
| Temp., °F. | 220 | | | |
| Agitator Speed, RPM | 250 | | | |
| Product Analysis | | | | |
| XRD | 75% | 60% | 60% | 50% |
| SEM, | 0.3 | — | — | — |
| TEM, Basal Dimension | — | 0.1–0.4 | 0.15–0.6 | 0.2–0.4 |
| Thickness, A | — | 100 | 100 | 100 |
| Mesitylene Sorption, wt % | 0.75 | 3.7 | 7.1 | 10.6 |

Examples 4A ET SEO

These examples from commonly assigned copending application 402,018, filed Sep. 1, 1989, reveal the decreased selectivity of the ZSM-5 having the foregoing characteristic of mesitylene absortion.

Example 4

Preparation of Small Crystal ZSM-5 From Forming Mixture Containing Organic

A 3.1 parts quantity, by weight, of n-propylamine was added to a mixture containing 1.1 parts sodium chloride, 0.2 parts ZSM-5 seeds, 0.2 parts dispersant (mixture of polymerized aryl and substituted benzoid alkyl sulfonic acids), 2.6 parts $Al_2(SO_4)_3.14\ H_2O$, 7.0 parts 50% NaOH, 25.8 parts amorphous precipitated silica (HiSil 233) and 59.9 parts water. The reaction mixture had a composition, in mole ratios, of:

$$SiO_2/Al_2O_3 = 65$$
$$H_2O/SiO_2 = 9.92$$
$$OH^-/SiO_2 = 0.163$$
$$N/Al_2O_3 = 9.2$$
$$OH^-/H_2O = 0.0165$$

wherein N is the n-propylamine. The hydroxide concentration is based on only inorganic sources.

The reaction mixture was then heated directly to 220° F. and stirred in an autoclave at that temperature for crystallization. After full crystallinity was achieved, the resulting crystals were separated from the remaining liquid by filtration, washed with water, exchanged with $NH_4NO_3$ and dried.

The resulting product had a $SiO_2/Al_2O_3$ molar ratio of about 50, a diffusion rate constant $(D/r^2 \times 10^{-6})$ of greater than 150 $sec^{-1} \times 10^{-6}$ and was composited with alumina binder to form a material having a ZSM-5 content of about 65 weight percent and an alpha of about 200. After steaming in 100% steam for 3 hours the alpha value was measured at about 40.

Example 5

Preparation of Small Crystal ZSM-5 from Non-Organic, Seeded Forming Mixture

A 7.3 parts quantity, by weight, of water was mixed with 12.8 parts 50% NaOH, 10.1 parts $Al_2(SO_4)_3.14\ H_2O$, 1.6 parts ZSM-5 seeds and 68.2 parts amorphous silica (47.6% solids) prepared by the neutralization of sodium silicate with sulfuric acid. The reaction mixture had a composition, in mole ratios, of:

| | |
|---|---|
| $SiO_2/Al_2O_3$ | = 32 |
| $H_2O/SiO_2$ | = 5.45 |
| $OH^-/SiO_2$ | = 0.105 |
| $OH^-/H_2O$ | = 0.0192 |

The reaction mixture was then heated directly to 220° F. and stirred in an autoclave at that temperature for crystallization. After full crystallinity was achieved, the resulting crystals were separated from remaining liquid by filtration, washed with water and dried.

The resulting product had a $SiO_2/Al_2O_3$ molar ratio of about 25, a diffusion rate constant $(D/r^2)$ greater than about 200 $sec^{-1} \times 10^{-6}$ and was composited with alumina binder so that the resulting product had a ZSM-5 content of about 65 weight percent and an alpha value of about 500.

After 8 hours of steaming in 100% steam at 1000° F., the alpha value was reduced to about 40.

Example 6

Ethylation of Benzene Using ZSM-5

The catalysts of Examples 5 and 4 were evaluated in a fixed bed reactor for the ethylbenzene reaction. The result is shown in Table 5. It is clear that under similar conditions and ethylene conversion, the by-product formation was similar for the two catalysts except the o-xylene selectivity. The yield of o-xylene from Example 2 was reduced by half.

TABLE 5

| Feed: | Benzene. 380 cc/hr; Ethylene, 160 cc/min |
|---|---|
| Temperature: | 750° F. |
| WHSV: | 4 (based on ethylene) |
| Pressure: | 300 psig |

| Catalyst | Example No. 4 | Example No. 5 |
|---|---|---|
| Ethylene Conversion | 98% | 98% |
| DIEB/EB | 0.082 | 0.086 |
| O-Xyl/EB $\times 10^{-4}$ | 1.800 | 0.900 |
| Xyl/EB $\times 10^{-4}$ | 11.600 | 12.900 |
| $C_9+$/EB | 0.086 | 0.098 |

Thus it is apparent that there has been provided, in accordance with the invention, a catalyst that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a catalyst comprising ZSM-5 which can produce m-xylene and p-xylene and o-xylene, at thermodynamic equilibrium, the improvement comprising producing a crystal of ZSM-5 for said catalyst which substantially eliminates its selectivity for o-xylene production, wherein said crystal of ZSM-5 has a sorption capacity for mesitylene of at least about 3 weight percent which is formed by a process which comprises:

a) providing a crystallization reaction mixture which includes a source of silica, and a source of alumina; wherein the mole ratios or components in said reaction mixture are in the approximate ranges of:
$SiO_2/Al_2O_3$ 25 to 50
$H_2O/SiO_2$ less than 5
$OH^-/SiO_2$ greater than 0.11.

b) maintaining the crystallization temperature at less than about 250° C.;

c) maintaining agitation conditions during crystallization effective to result in said crystal;

d) maintaining a mole ratio of $OH^-/SiO_2$ in the reaction mixture of at least about 0.11; and e) recovering said crystal.

2. The catalyst of claim 1, wherein said crystallization reaction mixture has a solids content of at least 35 weight percent; and wherein said source of silica is formed by providing a solution of silicate; providing a precipitating reagent which is effective to maintaining the molar ratio of said silicate to precipitating reagent at least substantially constant and contacting said solution with said precipitating reagent to effect formation of insoluble source of silica, wherein said contacting is undertaken continuously; whereby said source of silica has a particle size which ranges from about 1 to about 500 microns; and said source of silica is ion-exchangeable.

3. The catalyst of claim 1, wherein the mole ratios of compounds in said reaction mixture are in the approximate ranges of:

| | |
|---|---|
| $SiO_2/Al_2O_3$ | [25 to 50] 30 to 40 |
| $H_2O/SiO_2$ | less than [5] 4.9 |
| $OH^-/SiO_2$ | greater than [0.11] 0.12. |

4. The catalyst of claim 1, wherein the reaction mixture is free of organic directing agent.

5. The catalyst of claim 2, wherein the reaction mixture is free of organic directing agent.

6. The catalyst of claim 1, wherein said solids content is at least about 37 weight percent.

7. The catalyst of claim 1, wherein said $OH^-/SiO_2$ molar ratio is greater than about 0.12.

8. The catalyst of claim 7, wherein said $OH^-/SiO_2$ molar ratio is greater than about 0.12 to 0.20.

9. The catalyst of claim 1, wherein said reaction mixture has a $SiO_2/Al_2O_3$ molar ratio of less than about 50.

10. The catalyst of claim 9, wherein said reaction mixture has a $SiO_2/Al_2O_3$ molar ratio of less than about 40.

11. The catalyst of claim 10, wherein said reaction mixture has a $SiO_2/Al_2O_3$ molar ratio ranging between about 25 and about 40.

12. The catalyst of claim 11, wherein said porous crystalline silicate has a crystal size having at least one dimension less than about 0.02 microns.

13. The catalyst of claim 12, wherein said crystal size has at least one dimension less than about 0.01 micron.

14. The catalyst of claim 13, wherein said crystal size has at least one dimension less than about 0.005 micron.

15. The catalyst of claim 14, wherein said porous crystalline silicate is capable of sorbing at least about 5 weight percent mesitylene at room temperature.

16. The catalyst of claim 15, wherein said porous crystalline silicate is capable of sorbing at least about 7 weight percent mesitylene.

17. The catalyst of claim 16, wherein said porous crystalline silicate is capable of sorbing at least about 10 weight percent mesitylene.

18. The catalyst of claim 17, wherein said reaction mixture contains at least about 4 weight percent of seeds.

19. The catalyst of claim 18 having the structure of ZSM-5 in the form of a crystal having two dimensions of at least about 0.05 micron and a third dimension of less that about 0.02 micron wherein said crystal comprises a tortuous channel running substantially in the direction of said third dimension.

20. The process for forming ZSM-5 of claim 1, comprising
   a) providing a crystallization reaction mixture which includes a source of at least one component of crystalline silicate framework element, wherein the solids content of said source in the crystallization reaction mixture is at least 35 weight percent;
   b) maintaining the crystallization temperature at less than about 250° C.;
   c) maintaining agitation conditions during crystallization sufficient to result in said 25m-5;
   d) maintaining a mole ratio of $OH^-/SiO_2$ in the reaction mixture of at least about 0.11; and
   e) recovering porous crystalline silicate crystals.

* * * * *

UNITED STATES PATENT AND TRADEMARK OFFICE
CERTIFICATE OF CORRECTION

PATENT NO. : 5,240,892

DATED : August 31, 1993

INVENTOR(S) : Donald J. Klocke et al.

It is certified that error appears in the above-identified patent and that said Letters Patent is hereby corrected as shown below:

Col. 14, lines 27-29, Claim 3, delete "[25 to 50]", "[5]", and "[0.11]".

Col. 14, line 66, Claim 18, delete "said".

Col. 16, line 6, Claim 20, "25m-5" should read --ZSM-5--.

Title page, item [19] add --,et al--

Title page, item [75], add --S. Krishnamurthy--

Signed and Sealed this

First Day of March, 1994

BRUCE LEHMAN

Attest:

Attesting Officer

Commissioner of Patents and Trademarks